US012558947B2

(12) United States Patent
Asa et al.

(10) Patent No.: US 12,558,947 B2
(45) Date of Patent: Feb. 24, 2026

(54) VEHICLE

(71) Applicants:TOYOTA JIDOSHA KABUSHIKI KAISHA, Toyota (JP); SUBARU CORPORATION, Tokyo (JP)

(72) Inventors: Ryosuke Asa, Toyota (JP); Shota Kiyozumi, Tokyo (JP); Masayoshi Iwase, Toyota (JP); Akihisa Takeda, Okazaki (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 245 days.

(21) Appl. No.: 18/211,865

(22) Filed: Jun. 20, 2023

(65) Prior Publication Data

US 2024/0075800 A1　Mar. 7, 2024

(30) Foreign Application Priority Data

Sep. 5, 2022　(JP) ................................ 2022-140892

(51) Int. Cl.
B60K 1/04 (2019.01)
(52) U.S. Cl.
CPC ........ B60K 1/04 (2013.01); *B60K 2001/0438* (2013.01); *B60K 2001/0472* (2013.01)
(58) Field of Classification Search
CPC .......... B60K 17/22; B60K 17/24; B60K 6/28; B60K 1/00; B60K 17/00; B60K 2001/0411; B60K 5/02; B60K 1/04; B60K 2001/0438; B60K 2001/0472

USPC ........................................................ 180/68.5
See application file for complete search history.

(56) References Cited

U.S. PATENT DOCUMENTS

| | | | | | |
|---|---|---|---|---|---|
| 10,913,340 | B2 * | 2/2021 | Tsuyuzaki | ................ | B60K 1/04 |
| 11,447,184 | B2 * | 9/2022 | Takahashi | ............ | B62D 25/025 |
| 12,218,375 | B2 * | 2/2025 | Tononishi | ........... | H01M 50/293 |
| 2016/0288636 | A1 * | 10/2016 | Kamimura | ......... | B62D 25/2036 |
| 2019/0023323 | A1 * | 1/2019 | Uehata | ................ | B62D 25/025 |
| 2019/0382051 | A1 * | 12/2019 | Toyota | ................ | B62D 25/02 |
| 2021/0221435 | A1 * | 7/2021 | Takahashi | .............. | B62D 27/02 |

FOREIGN PATENT DOCUMENTS

| | | | | |
|---|---|---|---|---|
| JP | 2021-112973 A | 8/2021 | | |
| WO | WO-2022036364 A1 * | 2/2022 | ............... | B60K 1/04 |

* cited by examiner

*Primary Examiner* — James A Shriver, II
*Assistant Examiner* — Hilary L Johns
(74) *Attorney, Agent, or Firm* — Sughrue Mion, PLLC

(57) ABSTRACT

A vehicle includes a body including a rocker, the rocker being located outside a floor panel in a vehicle width direction and extending in a front-rear direction. The vehicle further includes a battery unit located under the floor panel and detachably attached to the body from below. The vehicle further includes a bracket fixed to the rocker. The vehicle further includes a pipe or wire fixed to the bracket, located outside the rocker or the battery unit in the vehicle width direction, and extending in the front-rear direction of the body. The vehicle further includes a rocker molding extending from a position facing an outer side surface of the rocker to a position facing a lower surface of the battery unit, the rocker molding covering an outer side of the pipe or wire in the vehicle width direction.

7 Claims, 5 Drawing Sheets

VEHICLE

CROSS-REFERENCE TO RELATED APPLICATION

This application claims priority to Japanese Patent Application No. 2022-140892 filed on Sep. 5, 2022, incorporated herein by reference in its entirety.

BACKGROUND

1. Technical Field

The technique disclosed in the present specification relates to vehicles.

2. Description of Related Art

Japanese Unexamined Patent Application Publication No. 2021-112973 (JP 2021-112973 A) discloses a vehicle with a battery unit placed under a floor panel.

SUMMARY

There are cases where the front and rear portions of a vehicle are connected by pipes (e.g., air conditioning pipes) or wires (e.g., wire harnesses). However, in the structure in which a battery unit is placed under a floor panel, it may not be possible to secure under the floor panel a space for passing the pipes or the wires.

The technique disclosed in the present specification is embodied as a vehicle. This vehicle includes a body including a rocker, the rocker being located outside a floor panel in a vehicle width direction and extending in a front-rear direction. The vehicle further includes a battery unit located under the floor panel and detachably attached to the body from below. The vehicle further includes a bracket fixed to the rocker. The vehicle further includes a pipe or wire fixed to the bracket, located outside the rocker or the battery unit in the vehicle width direction, and extending in the front-rear direction of the body. The vehicle further includes a rocker molding extending from a position facing an outer side surface of the rocker to a position facing a lower surface of the battery unit, the rocker molding covering an outer side of the pipe or wire in the vehicle width direction.

As used herein, the term "battery unit" is a concept including a collection of a plurality of detachable components. In the vehicle described above, pipes or wires can be routed outside the rocker or the battery unit in the vehicle width direction. Even when a space for passing pipes or wires cannot be secured under the floor panel, the front and rear portions of the vehicle can be connected by the pipes or wires.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
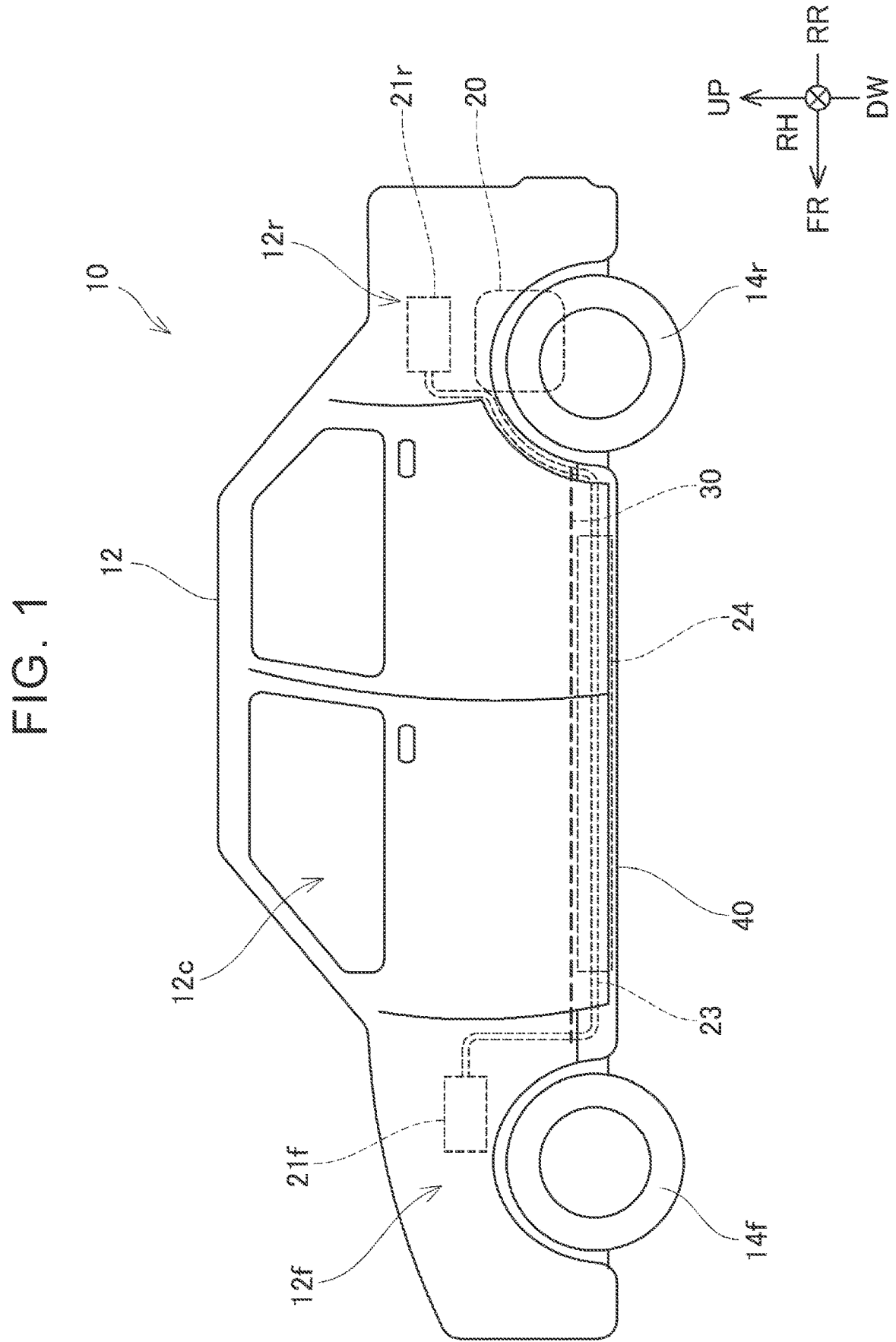
FIG. 1 is a side view schematically showing a vehicle 10 according to an embodiment.

In one embodiment of the present technique, the rocker molding may include a first fastening portion fastened to the bracket. With such a configuration, the bracket can also be supported by the rocker molding. Since the load applied to the bracket can thus be distributed, the mounting strength of the pipe or wire to the vehicle can be increased.

In the above embodiment, the battery unit may include a battery pack and a pair of shock absorbing members located on both sides in the vehicle width direction of the battery pack and each fixing the battery pack to the rocker. The vehicle may further include a second fastening portion fastening the rocker molding to the shock absorbing member. With such a configuration, the rocker molding can be fixed to the battery unit. The mounting strength of the rocker molding to the vehicle can thus be increased.

In the above embodiment, the rocker molding may include a first region facing the outer side surface of the rocker and facing a lower surface of the bracket, and a second region facing the lower surface of the battery unit. The rocker molding may further include a first hinge portion rotatably connecting the first region and the second region. The first region may be fixed to the body. The second region may be detachably fixed to the battery unit. With such a configuration, the second region can be rotated outward in the width direction when released from the battery unit. Accordingly, an operator can withdraw the second region from below the battery unit and remove the battery unit from the body without removing the first region from the vehicle. The ease of maintenance of the battery unit can thus be improved.

In the above embodiment, the first region may include a first portion facing the outer side surface of the rocker and a second portion facing the lower surface of the bracket. The rocker molding may further include a second hinge portion rotatably connecting the first portion and the second portion. With such a configuration, an opening can be formed by rotating the second portion of the rocker molding outward in the width direction with the first portion kept attached to the vehicle. Therefore, the inside covered by the rocker molding can be accessed through the opening with the rocker molding kept attached to the vehicle. The ease of assembly and ease of maintenance can thus be improved.

Structure of Vehicle 10

A vehicle 10 according to an embodiment will be described with reference to the drawings. The vehicle 10 is a so-called battery electric vehicle (BEV). In the drawings, the direction FR indicates forward in the front-rear direction of the vehicle 10, and the direction RR indicates rearward in the front-rear direction of the vehicle 10. The direction LH indicates leftward in the right-left direction (or width direction) of the vehicle 10, and the direction RH indicates rightward in the right-left direction of the vehicle 10. The direction UP indicates upward in the up-down direction of the vehicle 10, and the direction DW indicates downward in the up-down direction of the vehicle 10. In the present specification, the front-rear direction of the vehicle 10, the right-left direction of the vehicle 10, and the up-down direction of the vehicle 10 are sometimes simply referred to as as the front-rear direction, the right-left direction, and the up-down direction, respectively.

As shown in FIG. 1, the vehicle 10 includes a body 12, a plurality of wheels 14*f*, 14*r*, a motor 20, air conditioning units 21*f*, 21*r*, and a battery unit 24. The body 12 can be roughly divided into a cabin 12*c* where a user rides, a front portion 12*f* located in front of the cabin 12*c*, and a rear portion 12*r* located behind the cabin 12*c*.

The motor 20 is a traction motor that drives a pair of rear wheels 14*r*, and is mechanically connected to the rear wheels 14*r*. The battery unit 24 is a power supply device that supplies electric power to the motor 20, and is electrically connected to the motor 20 via a power control unit, not shown. The battery unit 24 contains a plurality of secondary battery cells, and is repeatedly rechargeable with external power or with regenerative power of the motor 20. The battery unit 24 is located under a floor panel 30 and is disposed along the floor panel 30.

The air conditioning units 21*f*, 21*r* are parts that control the temperature and volume of air and an air vent during cooling and heating in order to keep the vehicle cabin comfortable. The air conditioning units 21*f*, 21*r* are also called heating, ventilation, and air conditioning (HVAC). The air conditioning unit 21*f* is located in the front portion 12*f*, and the air conditioning unit 21*r* is located in the rear portion 12*r*. The air conditioning units 21*f*, 21*r* are connected by air conditioning pipes 23. The air conditioning pipes 23 will be specifically described in detail later.

Figure 2:
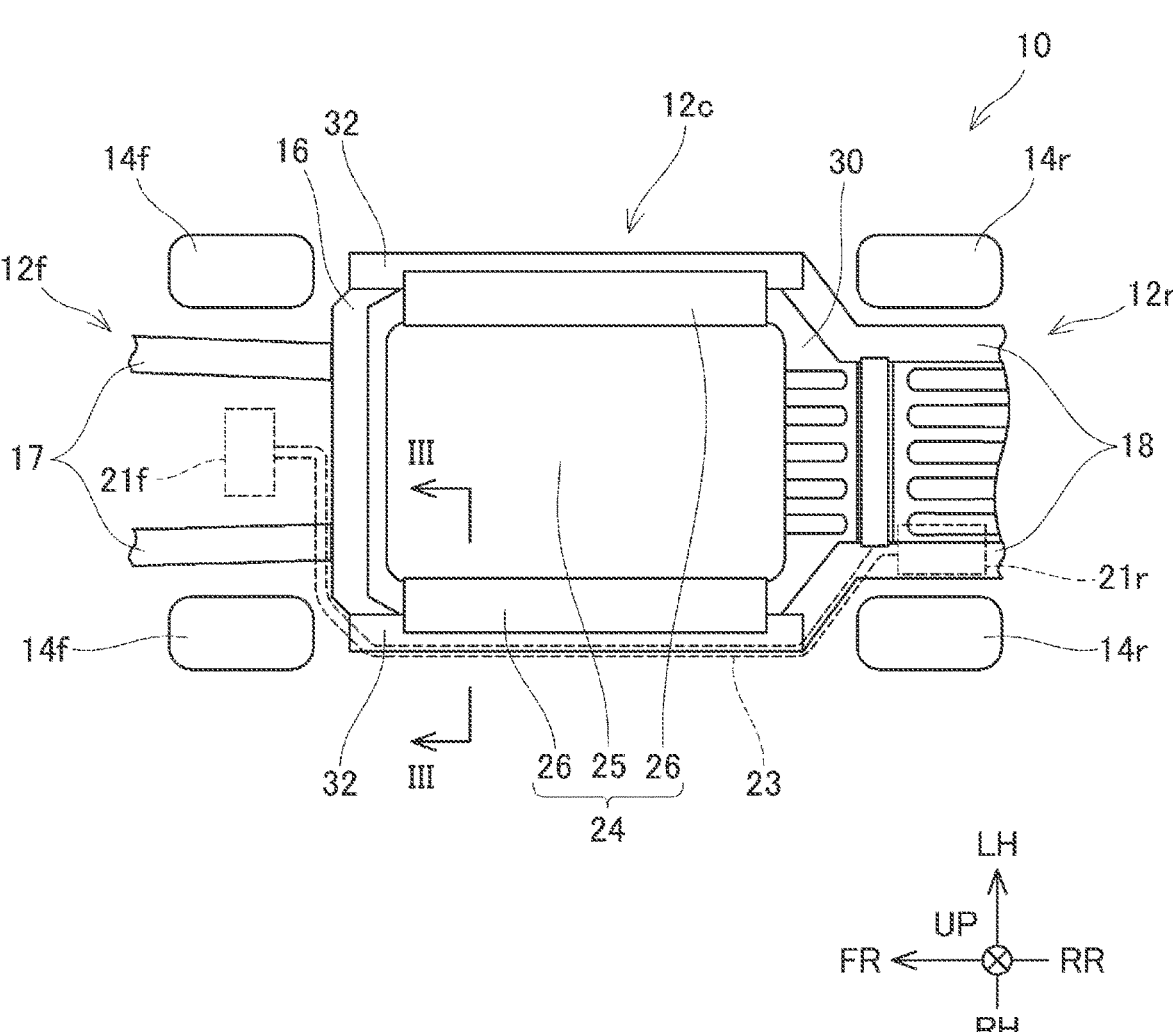
FIG. 2 is a bottom view schematically showing a main structure of the vehicle 10.

FIG. 2 is a bottom view schematically showing a main structure of the vehicle 10. A rocker molding 40 is not shown in FIG. 2. The body 12 includes the floor panel 30, a pair of rockers 32, a dash cross member 16, a pair of front side members 17, and a pair of rear side members 18. The floor panel 30 is a member in the form of a plate extending in the front-rear direction and the right-left direction, and forms the floor of the cabin 12*c*. The rockers 32 (also called "side sills") are located in the cabin 12*c*, and are provided on both sides in the right-left direction of the floor panel 30. Each rocker 32 generally has a tubular structure extending generally in the front-rear direction, and forms part of the skeleton of the body 12. The front end of each rocker 32 is connected to the dash cross member 16, and the rear end of each rocker 32 is connected to a corresponding one of the rear side members 18.

The battery unit 24 has a battery pack 25 and a pair of energy absorbing members 26. The battery unit 24 is located under the floor panel 30 of the body 12. The energy absorbing members 26 are located on both sides in the right-left direction of the battery pack 25 and extend in the front-rear direction. The battery pack 25 is fixed to the rockers 32 via the energy absorbing members 26.

In FIG. 2, the air conditioning units 21*f*, 21*r* and the air conditioning pipes 23 are shown by dashed lines. The air conditioning pipes 23 are placed so as to bypass the battery unit 24 from the air conditioning unit 21*f* to the front end of the rocker 32 on the right side of the vehicle 10. The air conditioning pipes 23 further extend in the front-rear direction under the rocker 32 on the right side of the vehicle 10 from the front end to the rear end of the rocker 32. The air conditioning pipes 23 are placed so as to further extend from the rear end of the rocker 32 to the air conditioning unit 21*f*. The air conditioning pipes 23 may be connected to the air vent (not shown) located in the rear portion 12*r*.

Figure 3:
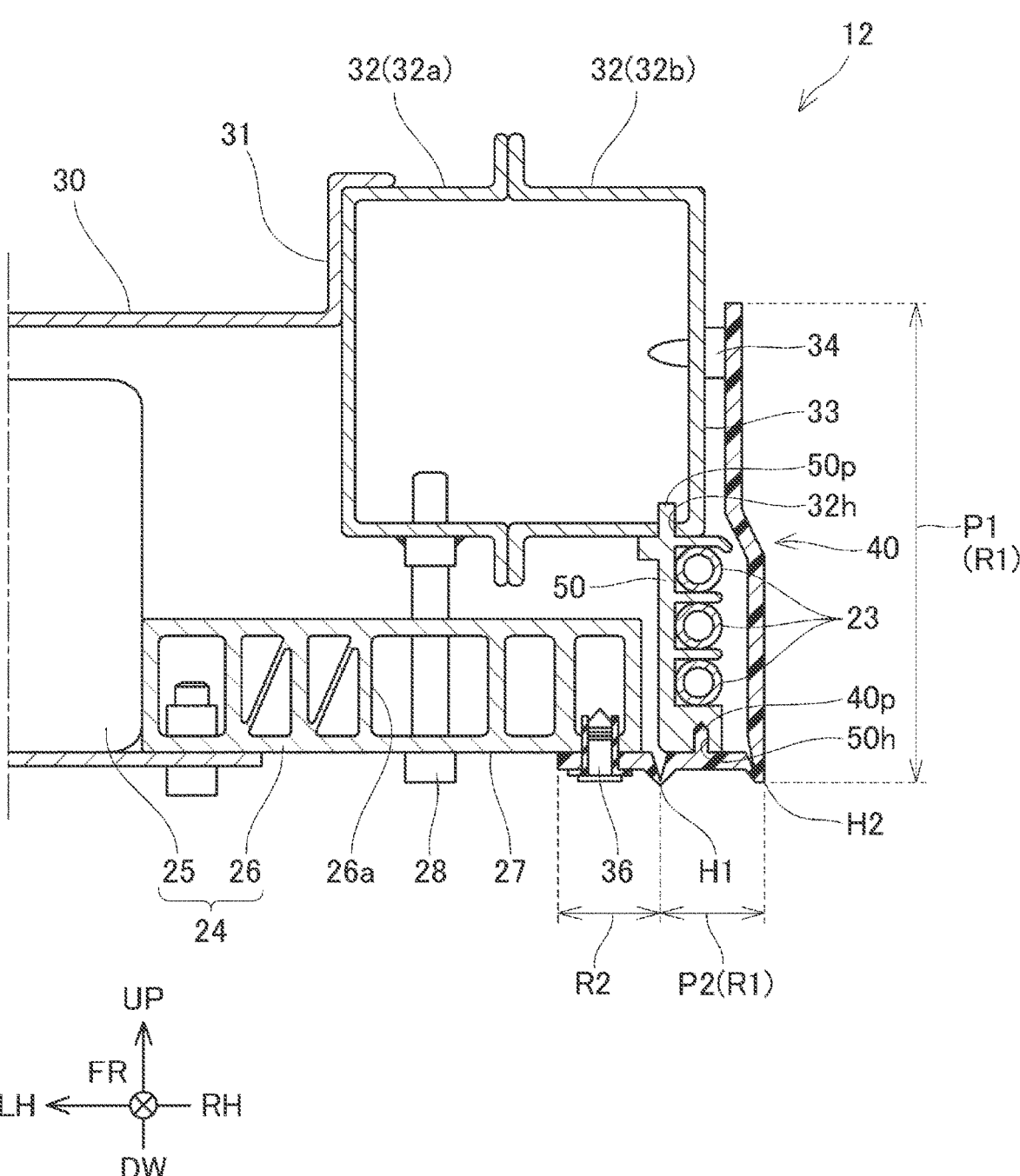
FIG. 3 is a sectional view taken along line III-III in FIG. 2.

FIG. 3 is a sectional view taken along line in FIG. 2. The structure on the right side of the vehicle 10 will be described with reference to FIG. 3. Each rocker 32 according to the present embodiment has a rocker inner panel 32*a* located on the inner side in the width direction and a rocker outer panel 32*b* located on the outer side in the width direction, although the technique disclosed in the present specification is not particularly limited to this. The rocker inner panel 32*a* and the rocker outer panel 32*b* are joined together at their upper edges and lower edges, so that a closed space extending in the front-rear direction is formed inside the rocker 32. The floor panel 30 extends between the rockers 32 and is joined to the rocker inner panels 32*a* at its both side edges 31.

As described above, the battery unit 24 is located under the floor panel 30. The battery unit 24 is detachably attached to the body 12 from below. As an example, the battery unit 24 according to the present embodiment is fixed to the rockers 32 via the energy absorbing members 26. The energy absorbing members 26 are located on both sides in the width direction of the battery pack 25, and are fixed to the battery pack 25.

Each energy absorbing member 26 is a hollow member made of metal such as aluminum, and has a plurality of voids 26*a* extending in the front-rear direction. Each energy absorbing member 26 is fixed to a corresponding one of the rockers 32 using a fastening member 28 such as a bolt and a nut. Accordingly, the battery unit 24 can be detached from the body 12 by removing the fastening members 28. A specific configuration of the energy absorbing members 26 is not particularly limited. The energy absorbing members 26 are not necessarily required.

The rocker molding 40, a bracket 50, and the air conditioning pipes 23 are provided in a manner shown in FIG. 3. The bracket 50 has a protruding portion 50*p*. The protruding portion 50*p* is engaged with a hole 32*h* formed in the rocker 32. The bracket 50 is thus fixed to the rocker 32. The bracket 50 may be a single part in the form of a rail extending along the rocker 32. Alternatively, the bracket 50 may be a plurality of parts located at a plurality of positions along the rocker 32.

The bracket 50 is a portion for fixing and holding the air conditioning pipes 23. The air conditioning pipes 23 are disposed in a region outside the battery unit 24 in the vehicle width direction and under the rocker 32. The air conditioning pipes 23 are pipes for carrying various liquids (e.g., a refrigerant) and gases (e.g., temperature-controlled air), and extend in the front-rear direction of the body 12. In the present embodiment, three air conditioning pipes 23 are placed.

Each rocker molding 40 is an exterior panel that mainly covers a corresponding one of the rockers 32. The rocker molding 40 extends from a position facing an outer side surface 33 of the rocker 32 to a position facing the lower surface of the battery unit 24. The outer side surface 33 of the rocker 32 herein means the area located on the outer side in the width direction out of the side surfaces of the rocker 32 extending in the front-rear direction. That is, the rocker molding 40 covers the outer sides in the vehicle width direction of the air conditioning pipes 23. The rocker molding 40 is made of a polymer material such as a resin material, although the technique disclosed in the present specification is not particularly limited to this. The rocker molding 40 is also called, for example, a rocker panel molding, a rocker trim panel, a side sill molding, or a side sill trim panel.

The rocker molding 40 includes a first region R1, a second region R2, a first hinge portion H1, and a second hinge portion H2. The first region R1 includes a first portion P1 and a second portion P2. The first hinge portion H1 rotatably connects the first region R1 and the second region R2. The second hinge portion H2 rotatably connects the first portion P1 and the second portion P2. The first hinge portion H1 and the second hinge portion H2 extend in the front-rear direction, and their rotation axes are parallel to the front-rear direction. As an example, each of the first hinge portion H1 and the second hinge portion H2 according to the present embodiment is an integral hinge, and is formed by a bending groove. Therefore, the first portion P1 of the first region R1, the second portion P2 of the first region R1, and the second region R2 are formed by a single member.

The first portion P1 of the first region R1 faces the outer side surface 33 of the rocker 32. The first portion P1 is fixed to the rocker 32 using a plurality of fasteners 34. The lower end of the first portion P1 connects to the outer end in the vehicle width direction of the second portion P2 via the second hinge portion H2.

The upper surface of the second portion P2 faces the lower surface of the bracket 50. The lower surface of the bracket 50 has a hole 50h. The upper surface of the second portion P2 has a protruding portion 40p. The protruding portion 40p has a shape called a tab in a mechanical term, and is elastically deformable. The protruding portion 40p is engaged with the hole 50h. The rocker molding 40 is thus fastened to the bracket 50.

The inner end in the vehicle width direction of the second portion P2 connects to the second region R2 via the first hinge portion H1. The second region R2 faces the lower surface of the battery unit 24 (specifically, a lower surface 27 of the energy absorbing member 26). The second region R2 is fastened to the energy absorbing member 26 using a plurality of fasteners 36. That is, the first region R1 is fixed to the body 12, and the second region R2 is detachably fixed to the battery unit 24.

Although the protruding portion 40p and the fastener 36 are shown in the same plane in FIG. 3, the technique disclosed in the present specification is not limited to this form. The protruding portions 40p and the fasteners 36 may be arranged in a staggered manner in different sections in the front-rear direction. This can reduce the number of protruding portions 40p and the number of fasteners 36 while maintaining the fixing strength.

Effects

In the structure in which the battery unit 24 is placed under the floor panel 30 in order to secure the cabin space, it may not be possible to secure under the floor panel 30 a space for passing the air conditioning pipes 23 etc. For example, as shown in FIG. 2, when the battery unit 24 is placed along the entire length in the vehicle width direction, there is no space under the floor panel 30 for passing a piping path extending from the front portion 12f to the rear portion 12r. In the vehicle 10 according to the present embodiment, the air conditioning pipes 23 can be routed outside the battery unit 24 in the vehicle width direction (see FIG. 3). The air conditioning pipes 23 connecting the front portion 12f and the rear portion 12r of the vehicle 10 can thus be placed even when it is not possible to secure under the floor panel 30 a space for passing pipes. The air conditioning pipes 23 can also be hidden by the rocker molding 40.

The rocker molding 40 has the protruding portion 40p fastened to the bracket 50. The bracket 50 can thus be supported not only by the rocker 32 but also by the rocker molding 40. Since the load applied to the bracket 50 can be distributed to the rocker 32 and the rocker molding 40, the mounting strength of the air conditioning pipes 23 can be increased.

The fasteners 36 fasten the second region R2 of the rocker molding 40 to the energy absorbing member 26 of the battery unit 24. The rocker molding 40 can thus be fixed to the battery unit 24. Since the load applied to the bracket 50 can be supported by three points, namely the rocker 32, the rocker molding 40, and the battery unit 24, the mounting strength of the air conditioning pipes 23 can be increased.

Figure 4:
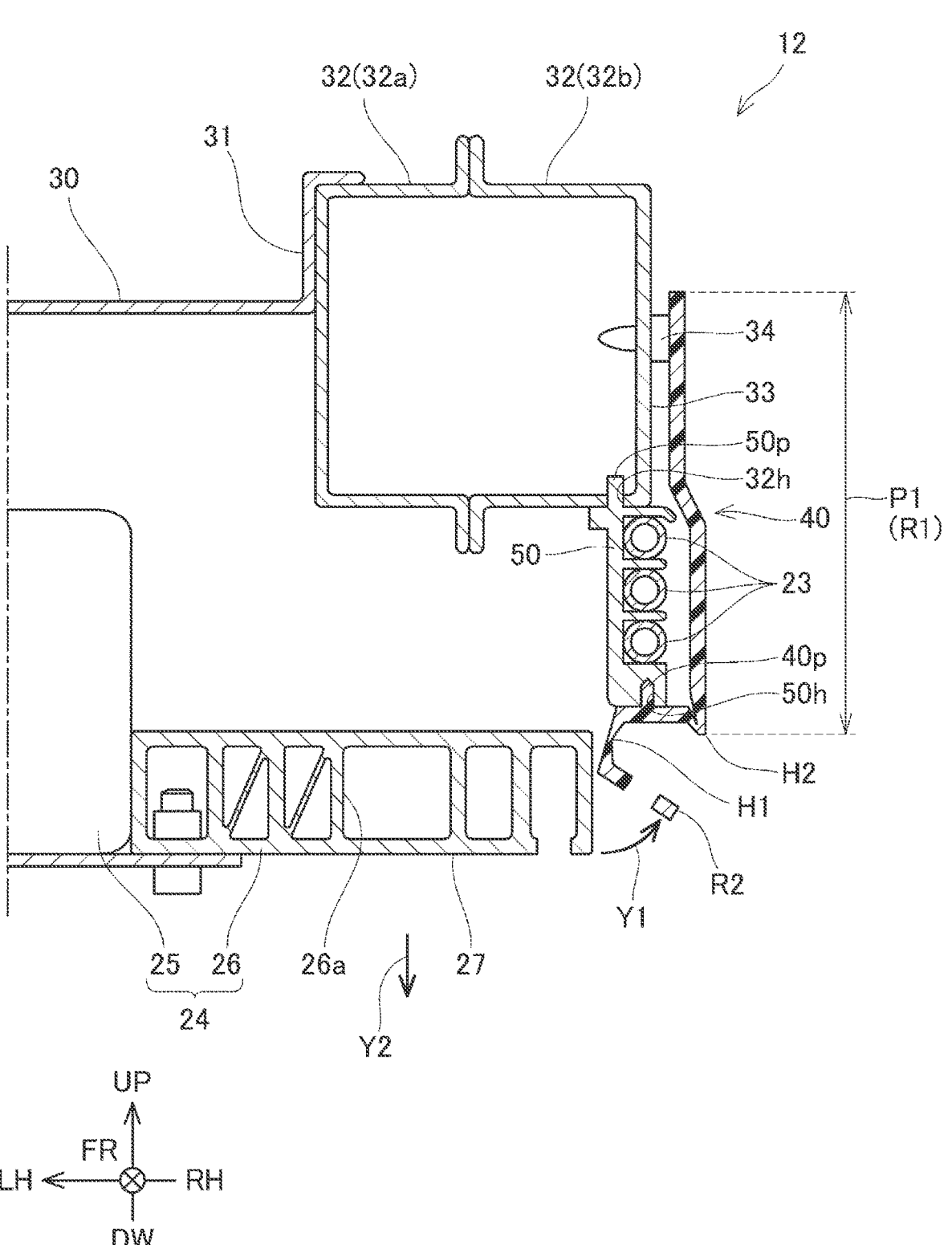
FIG. 4 shows a second region R2 rotated outward in a width direction about a first hinge portion H1.

As shown in FIG. 4, the second region R2 can be released from the battery unit 24 by removing the fasteners 36. The second region R2 can therefore be rotated outward in the width direction about the first hinge portion H1 (arrow Y1). Accordingly, an operator can withdraw the second region R2 of the rocker molding 40 from below the battery unit 24 and remove the battery unit 24 from the body 12 without removing the first region R1 from the vehicle 10 (arrow Y2). The ease of maintenance of the battery unit 24 can thus be improved.

Figure 5:
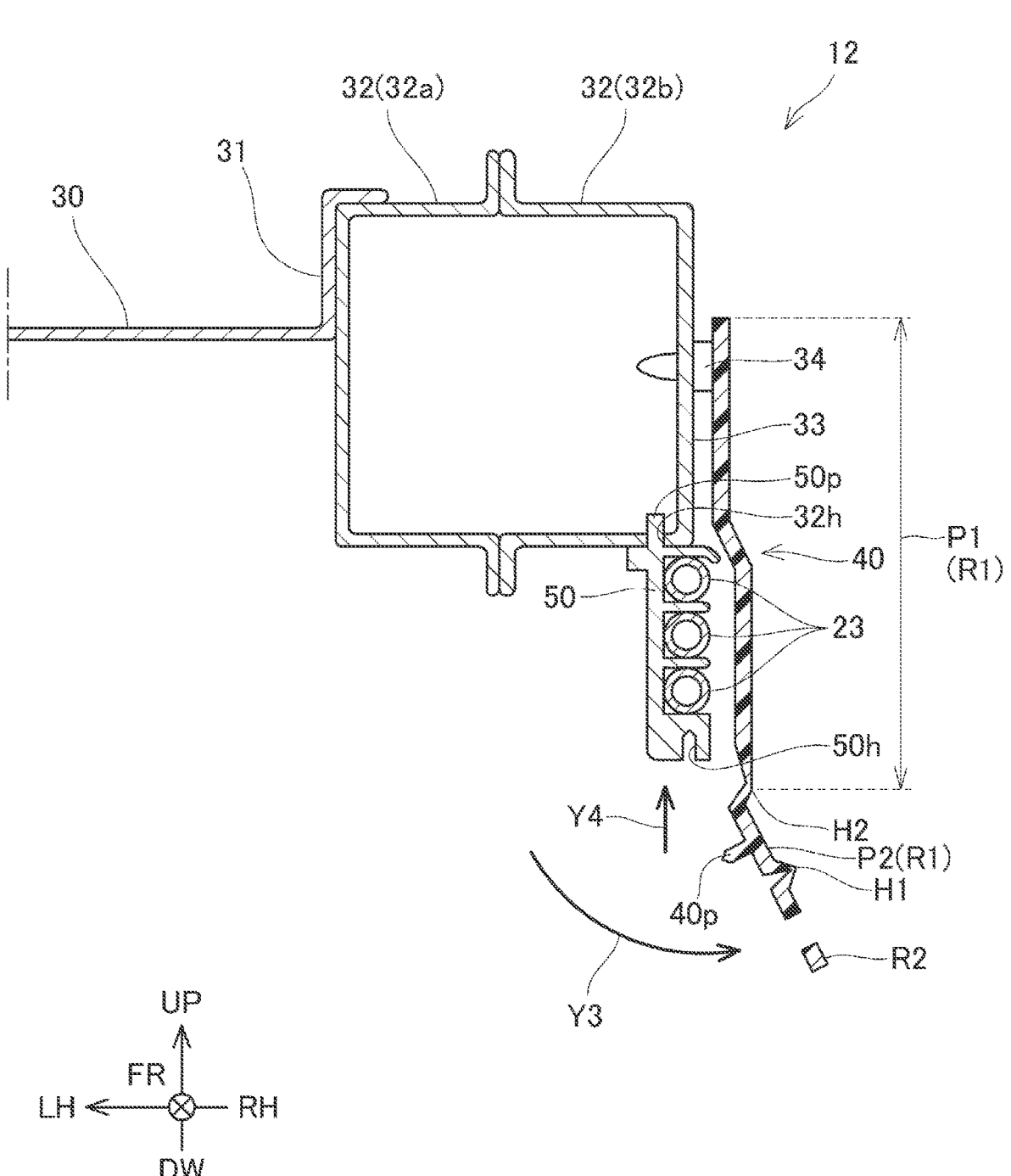
FIG. 5 shows both a second portion P2 and the second region R2 rotated outward in the width direction about a second hinge portion H2.

As shown in FIG. 5, the second portion P2 of the first region R1 and the second region R2 can be rotated outward in the width direction about the second hinge portion H2 (arrow Y3). The lower surface of the rocker 32 can therefore be accessed with the first region R1 of the rocker molding 40 kept fixed to the rocker 32 by the fasteners 34. Accordingly, the operator can fix the bracket 50 to the rocker 32 after attaching the rocker molding 40 to the rocker 32 (arrow Y4). The flexibility in the process of assembling the bracket 50 can thus be improved.

Although the embodiment of the present technique is described in detail above, the embodiment is merely illustrative and is not intended to limit the scope of the claims. The technique described in the claims includes various modifications and alternations of the specific example illustrated above. The technical elements described in the present specification or illustrated in the drawings exhibit technical utility alone or in various combinations, and are not limited to the combinations described in the claims as filed. The technique illustrated in the present specification or in the drawings can achieve a plurality of objects at the same time, and achieving one of the objects itself has technical utility.

Modifications

The above embodiment illustrates an example in which the air conditioning pipes 23 are routed outside the battery unit 24 in the vehicle width direction. However, the technique disclosed in the present disclosure is not limited to this form. Various wires (e.g., wire harnesses) that connect the front portion 12f and the rear portion 12r may be routed.

The bracket 50 and the air conditioning pipes 23 need not necessarily be placed outside the rocker 32 in the vehicle width direction, and may be placed outside the battery unit 24 in the vehicle width direction.

The member that fastens the rocker molding 40 to the lower surface of the bracket 50 is not limited to the protruding portion 40p, and may be in various forms. For example, a clip separate from the rocker molding 40 may be used to fasten the rocker molding 40 and the lower surface of the bracket 50 together.

The vehicle 10 may include only the air conditioning unit 21f. In this case, temperature-controlled air may be supplied to the air vent at the rear of the cabin 12c through the air conditioning pipes 23.

The specific configurations of the first hinge portion H1 and the second hinge portion H2 are not particularly limited. As another embodiment, the first hinge portion H1 and the second hinge portion H2 may be configured to rotatably connect the rocker moldings 40 formed by separate members.

The vehicle 10 is not limited to a battery electric vehicle described herein, and may be a hybrid electric vehicle, a fuel cell electric vehicle, a solar-powered car, etc. The vehicle 10 according to the embodiment is not limited to vehicles that are driven by users, and also includes vehicles operated by external devices and autonomous vehicles.

The protruding portion 40*p* is an example of the first fastening portion. The fastener 36 is an example of the second fastening portion.

What is claimed is:

1. A vehicle, comprising:

a body including a rocker, the rocker being located outside a floor panel in a vehicle width direction and extending in a front-rear direction;

a battery unit located under the floor panel and detachably attached to the body from below;

a bracket fixed to the rocker;

a pipe or a wire fixed to the bracket, located outside the rocker or the battery unit in the vehicle width direction, and extending in the front-rear direction of the body; and a rocker molding extending from a position facing an outer side surface of the rocker to a position facing a lower surface of the battery unit, the rocker molding covering an outer side of the pipe or an outer side of the wire in the vehicle width direction.

2. The vehicle according to claim 1, wherein the rocker molding includes a first fastening portion fastened to the bracket.

3. The vehicle according to claim 1, wherein the battery unit includes a battery pack, and a pair of shock absorbing members located on both sides in the vehicle width direction of the battery pack and each fixing the battery pack to the rocker, the vehicle further comprising a second fastening portion fastening the rocker molding to the shock absorbing member.

4. The vehicle according to claim 1, wherein:

the rocker molding includes a first region facing the outer side surface of the rocker and facing a lower surface of the bracket, and a second region facing the lower surface of the battery unit;

the rocker molding further includes a first hinge portion rotatably connecting the first region and the second region;

the first region is fixed to the body; and the second region is detachably fixed to the battery unit.

5. The vehicle according to claim 4, wherein:

the first region includes a first portion facing the outer side surface of the rocker and a second portion facing the lower surface of the bracket; and the rocker molding further includes a second hinge portion rotatably connecting the first portion and the second portion.

6. The vehicle according to claim 1, wherein the bracket is located outside the battery unit in the vehicle width direction and under the rocker.

7. The vehicle according to claim 6, wherein the bracket is holding the pipe or the wire.

* * * * *